Sept. 11, 1934.　　　C. M. BOLSTER　　　1,972,863
HANDLING APPARATUS FOR AIRSHIPS
Filed Aug. 3, 1933　　　14 Sheets-Sheet 1
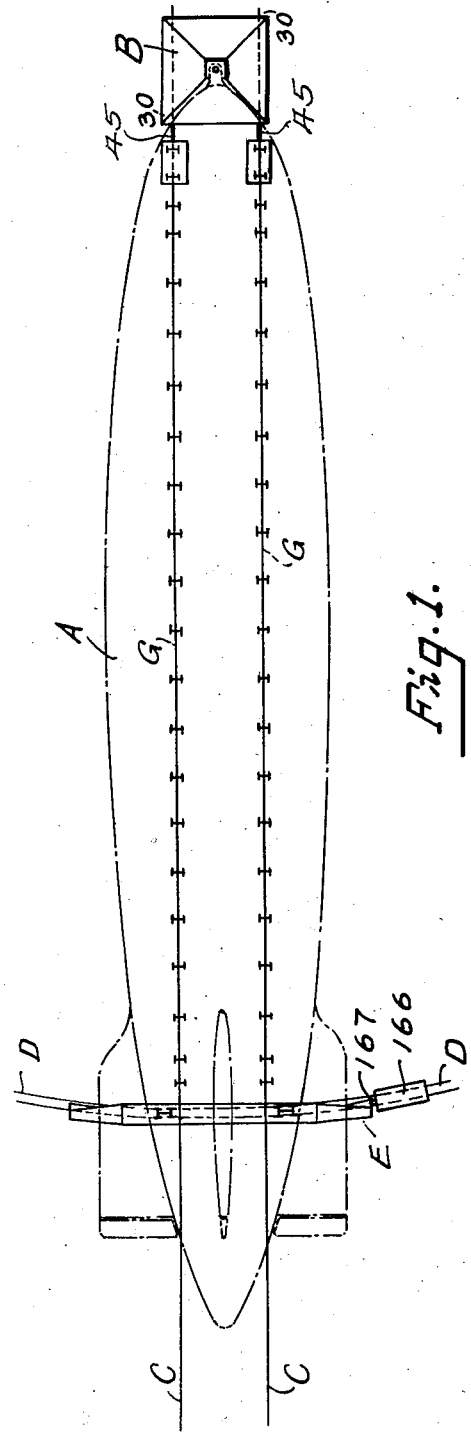
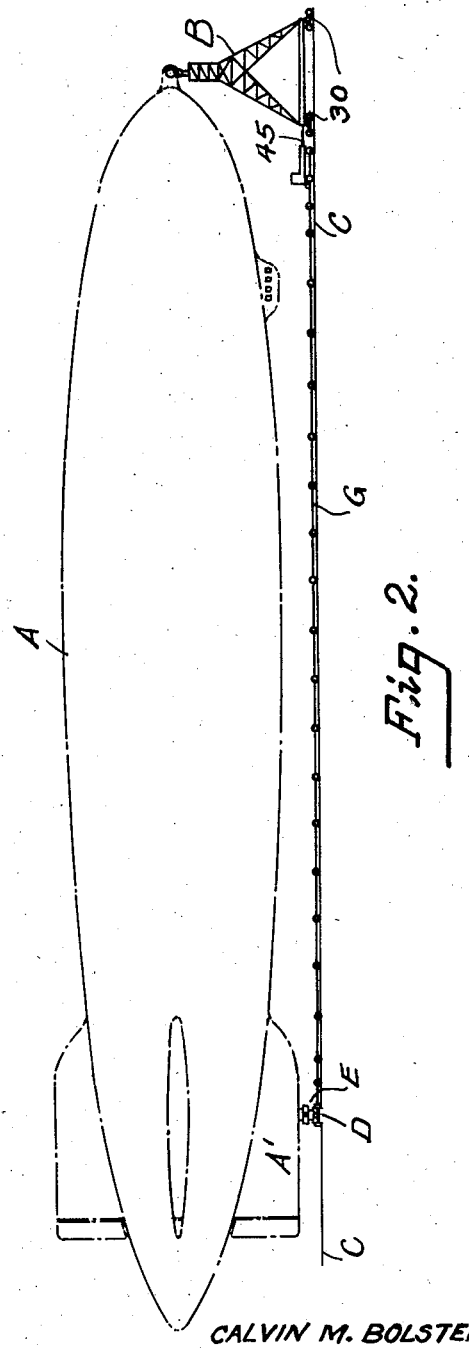
CALVIN M. BOLSTER
INVENTOR
BY
ATTORNEY Sept. 11, 1934.                 C. M. BOLSTER                  1,972,863
                        HANDLING APPARATUS FOR AIRSHIPS
                        Filed Aug. 3, 1933      14 Sheets-Sheet 2

Fig. 3.

CALVIN M. BOLSTER
INVENTOR

BY

Howell Dodd
ATTORNEY

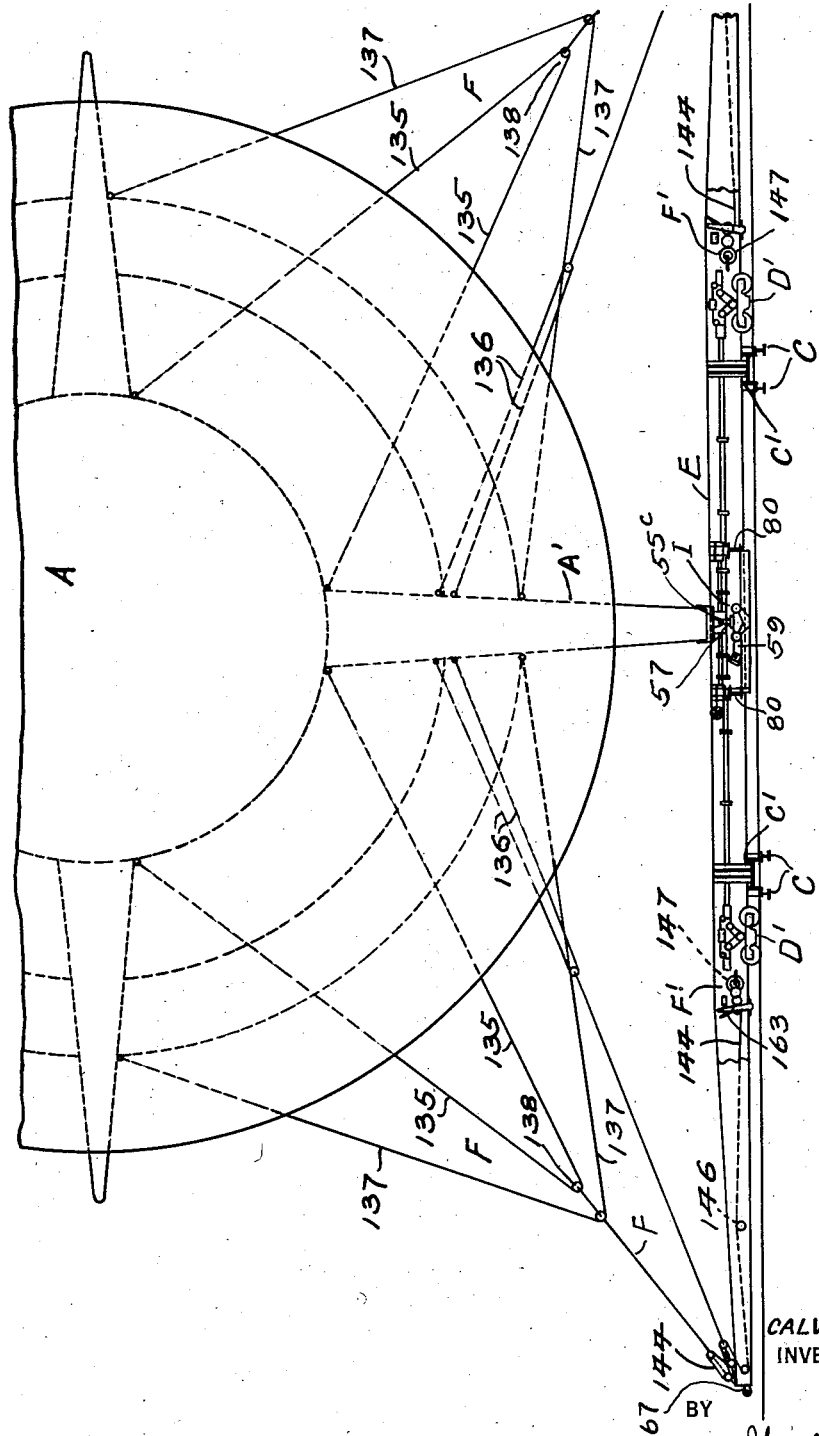

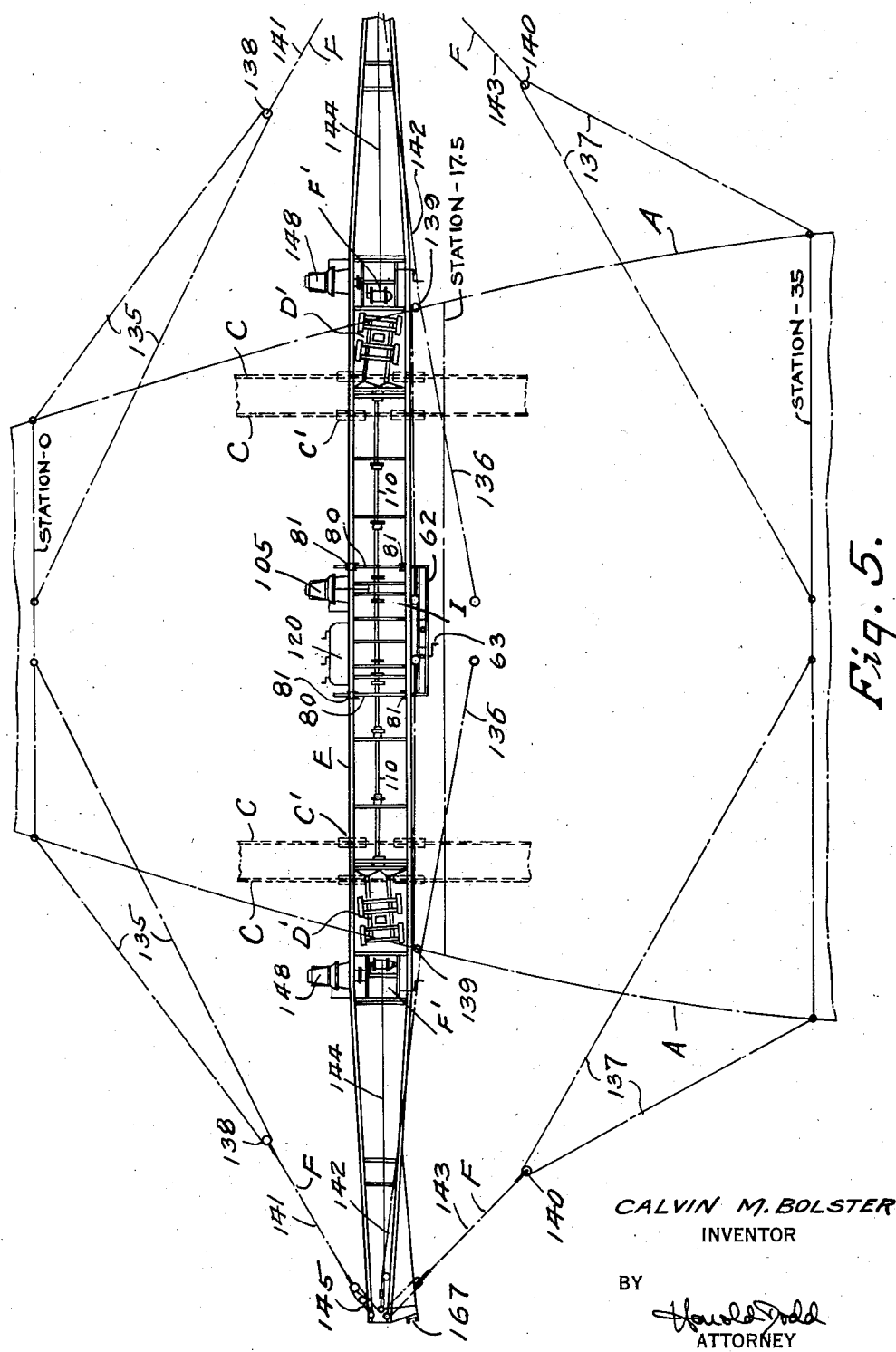

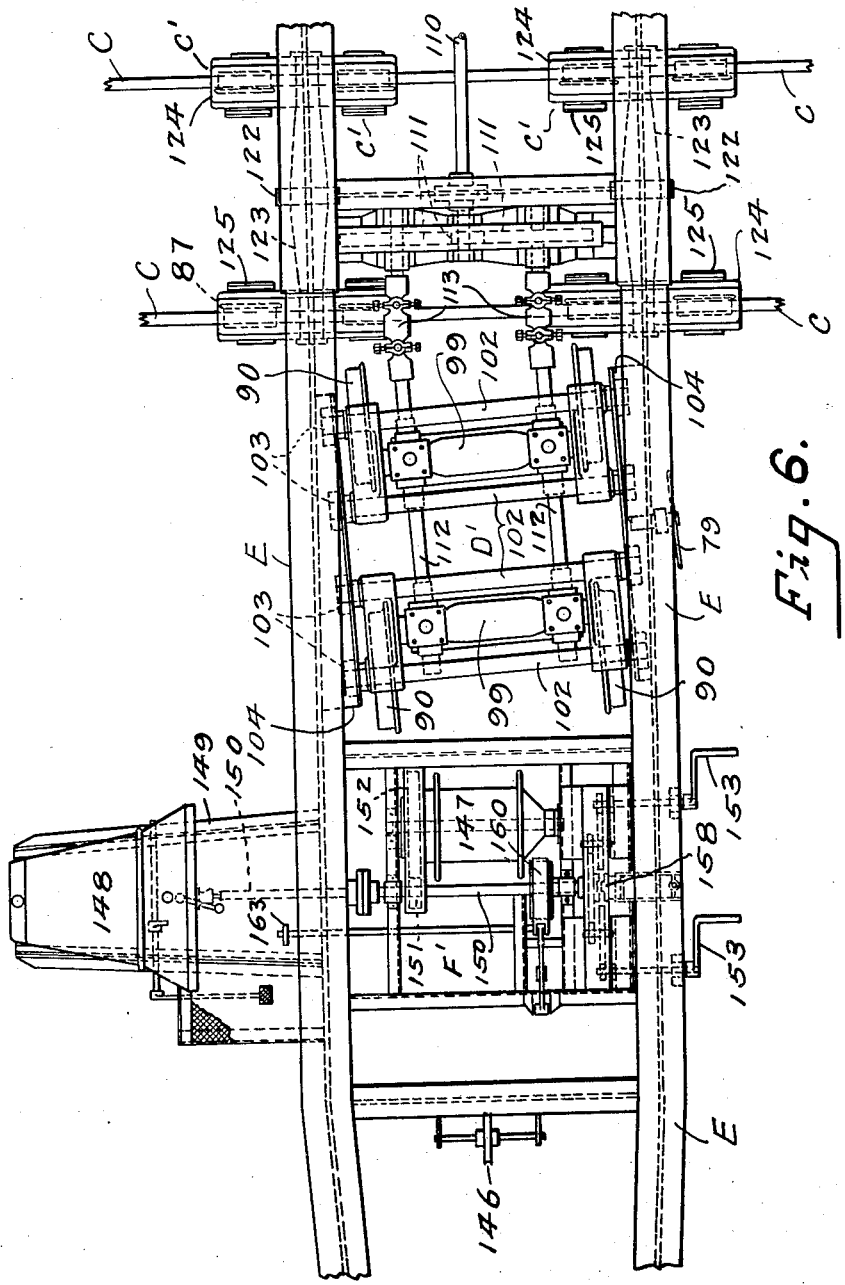

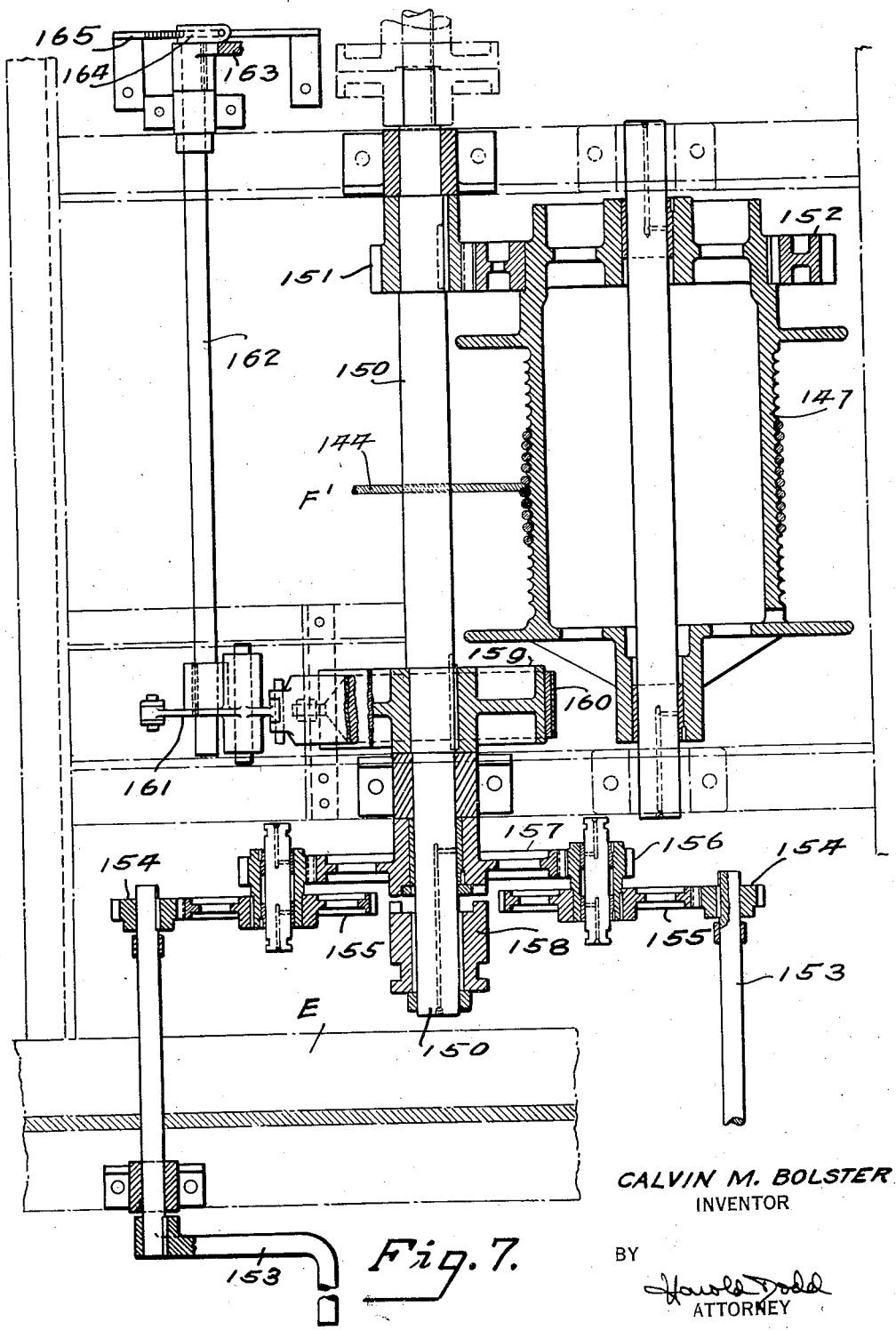

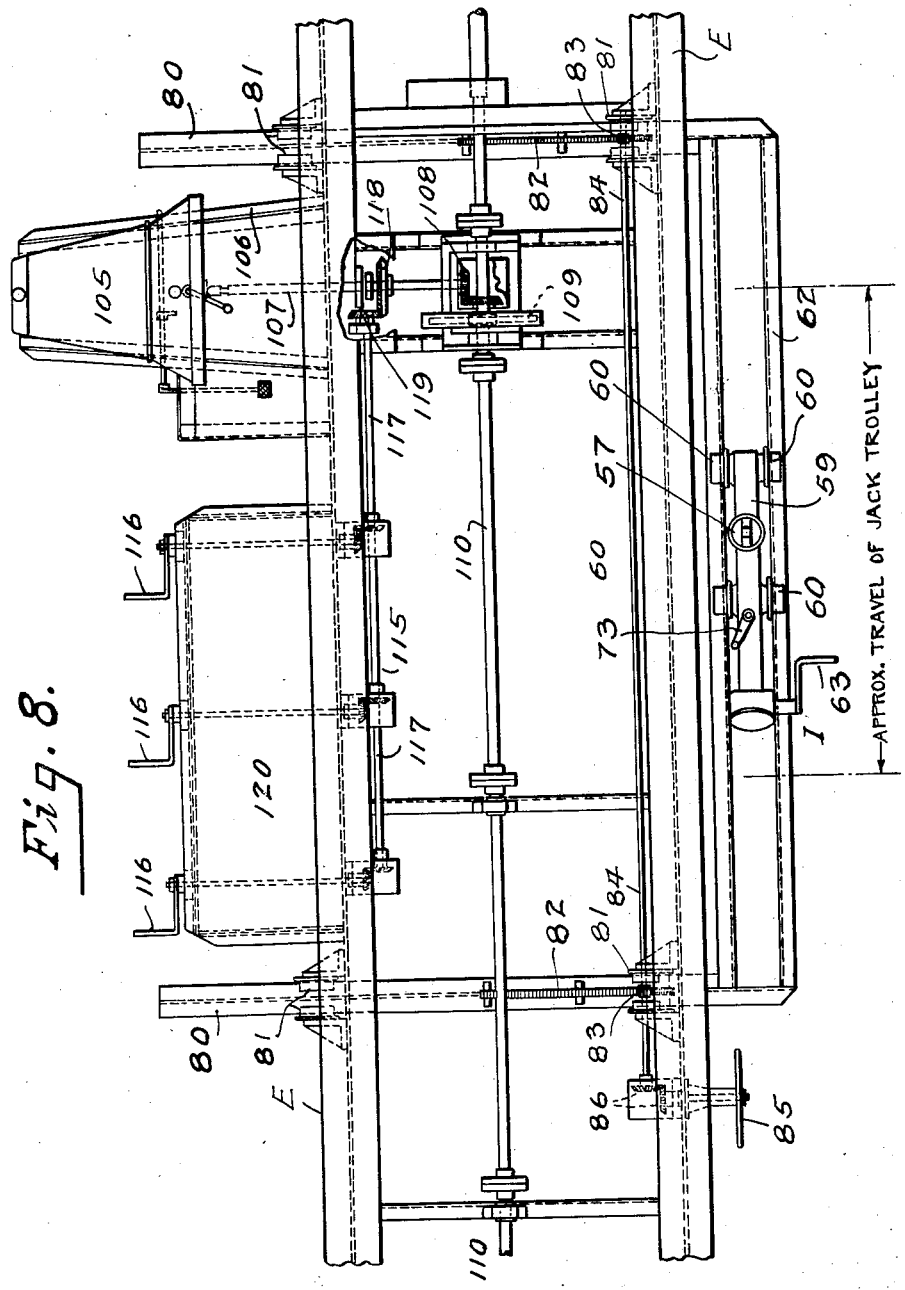

Sept. 11, 1934.  C. M. BOLSTER  1,972,863
HANDLING APPARATUS FOR AIRSHIPS
Filed Aug. 3, 1933  14 Sheets-Sheet 8
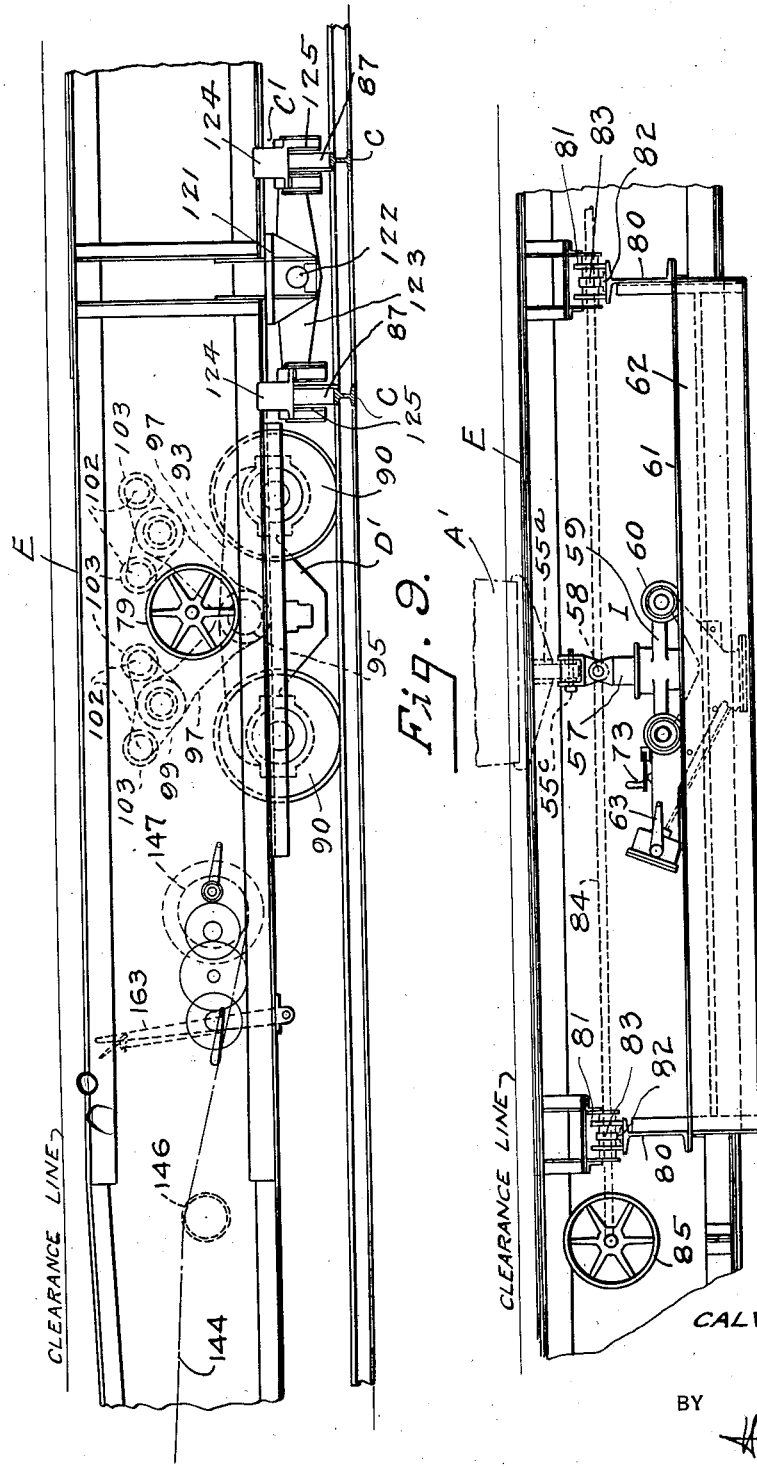
CALVIN M. BOLSTER
INVENTOR
BY
ATTORNEY

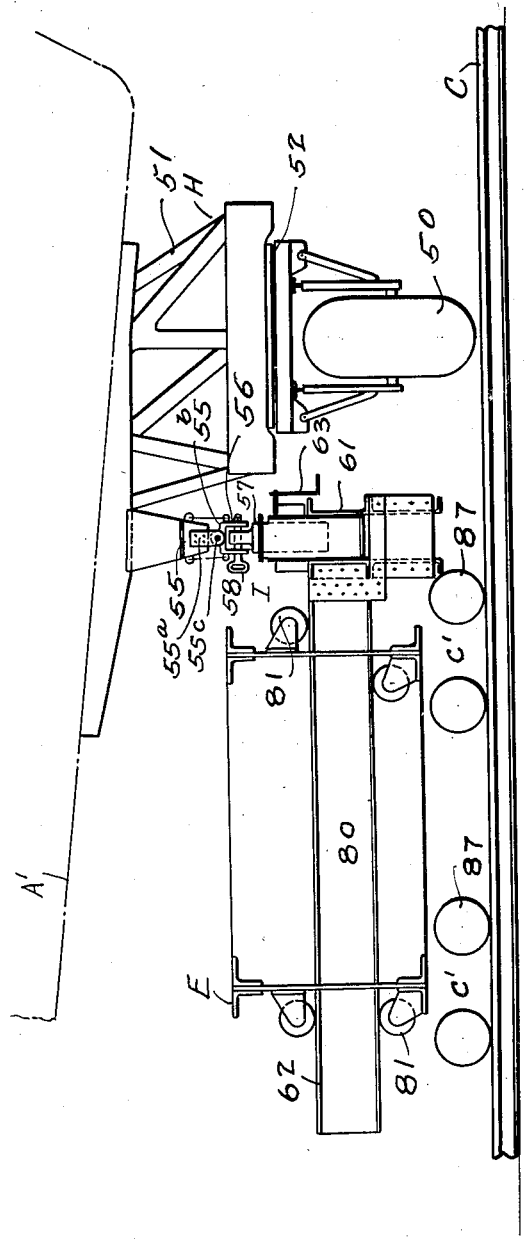

Sept. 11, 1934. C. M. BOLSTER 1,972,863
HANDLING APPARATUS FOR AIRSHIPS
Filed Aug. 3, 1933 14 Sheets-Sheet 10
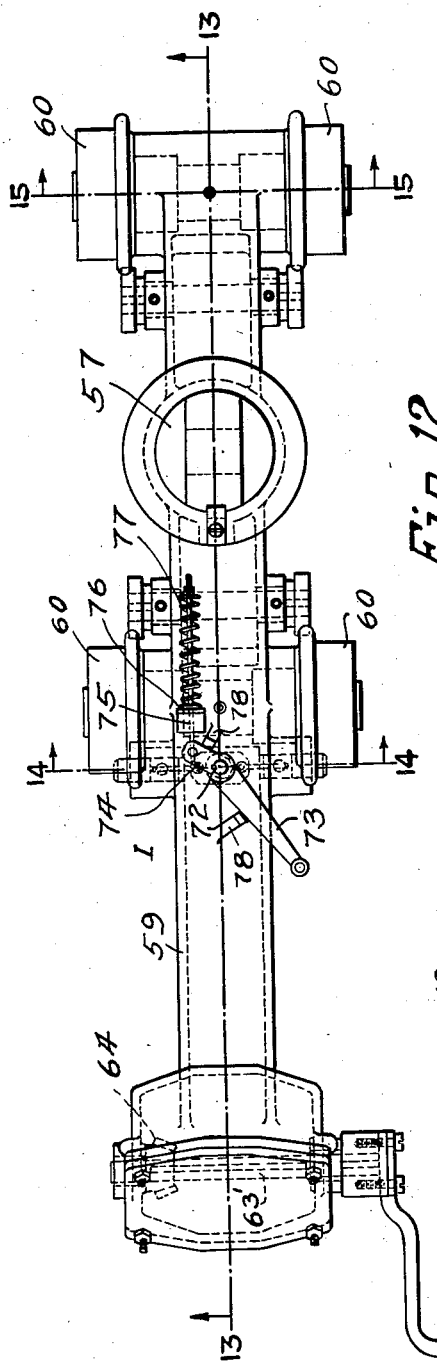
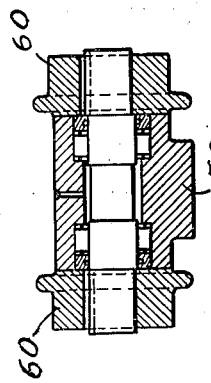
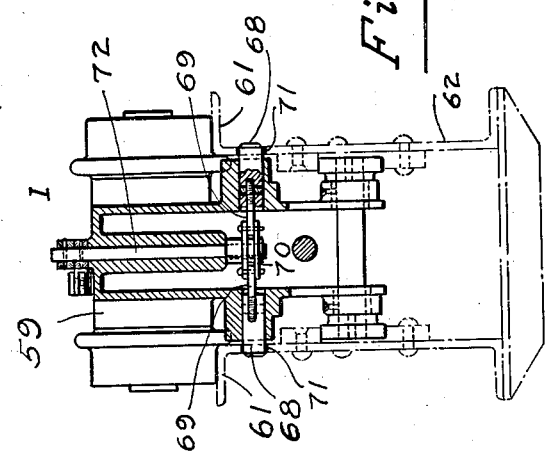
CALVIN M. BOLSTER
INVENTOR
BY
*Harold Dodd*
ATTORNEY

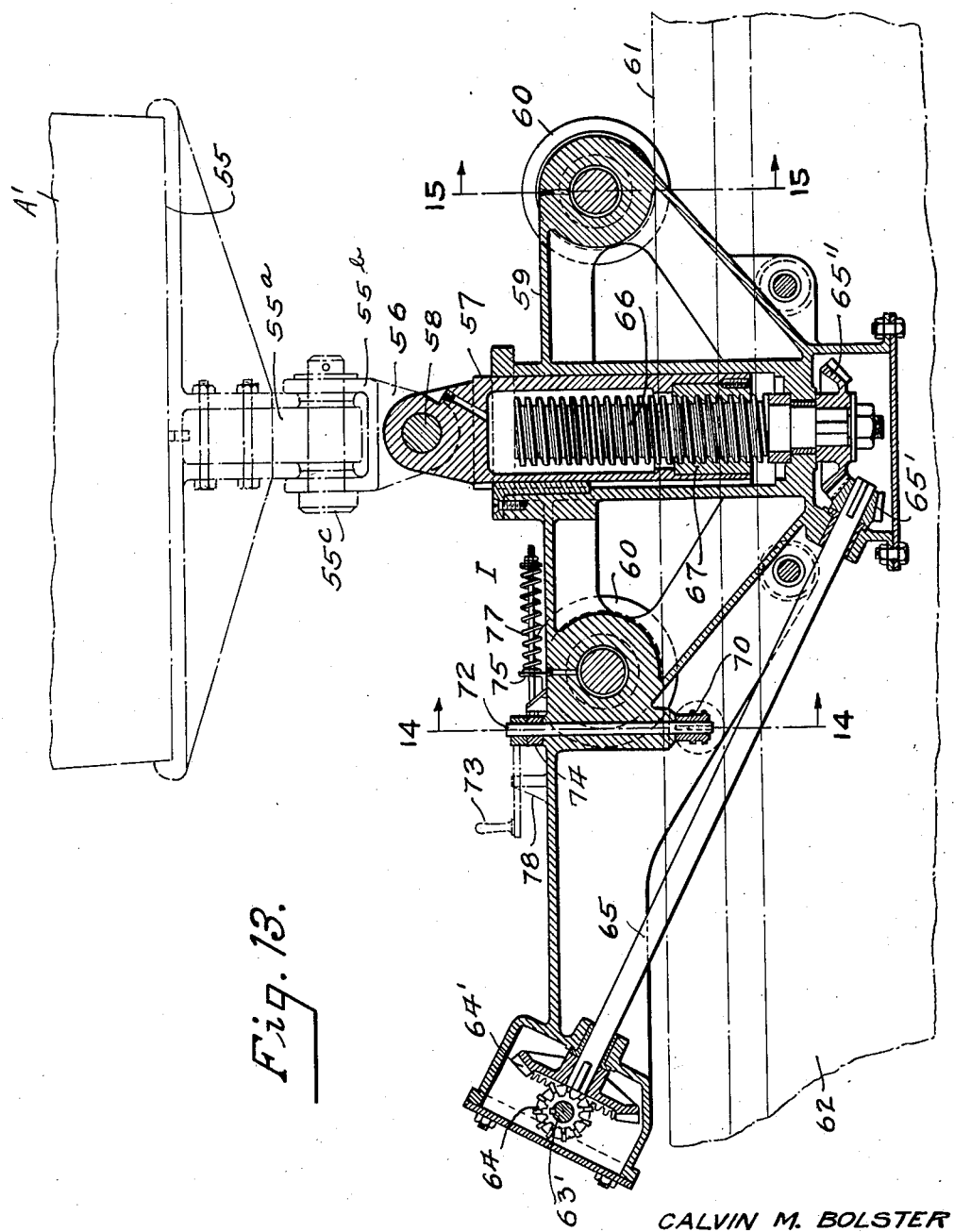

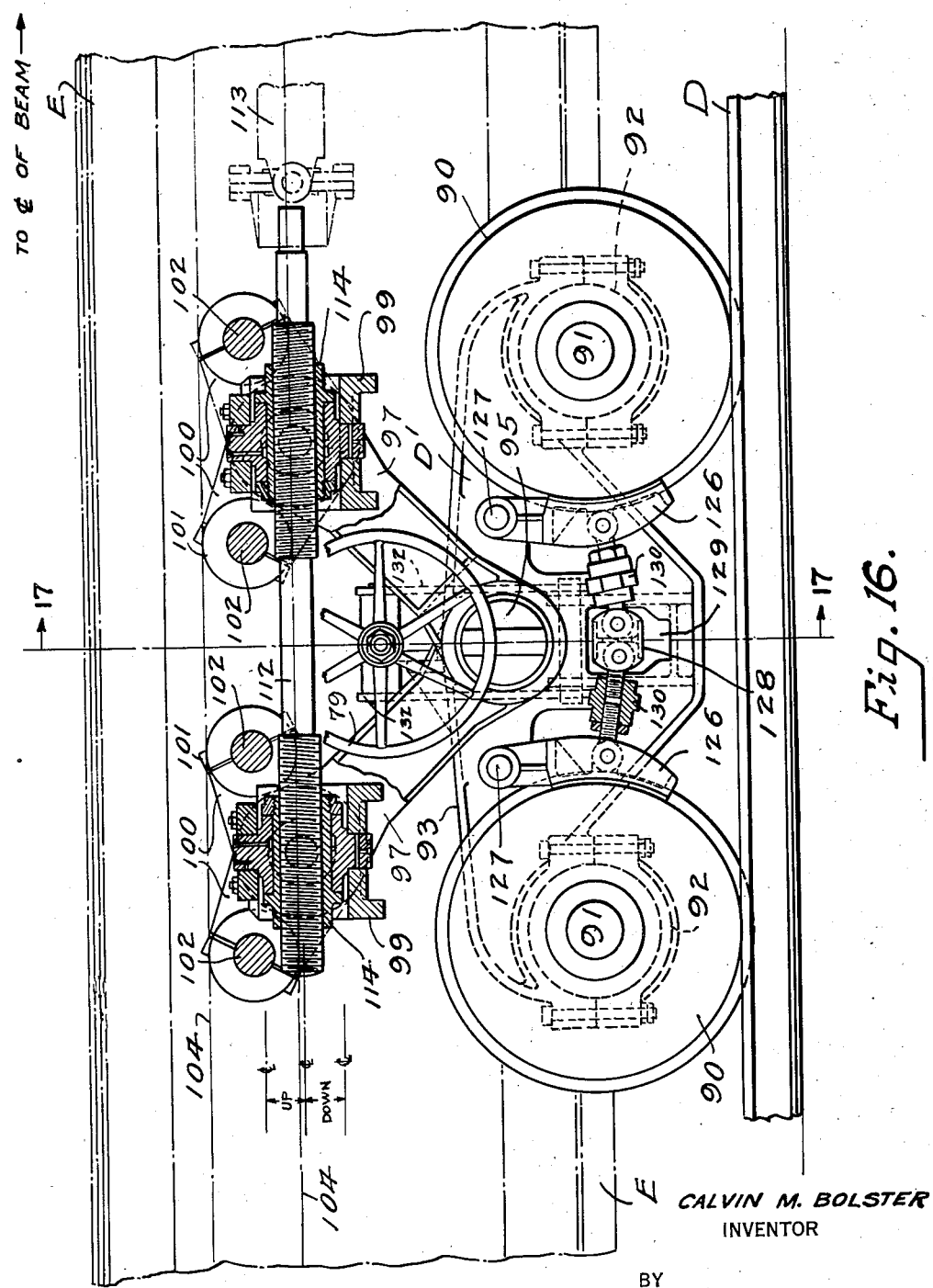

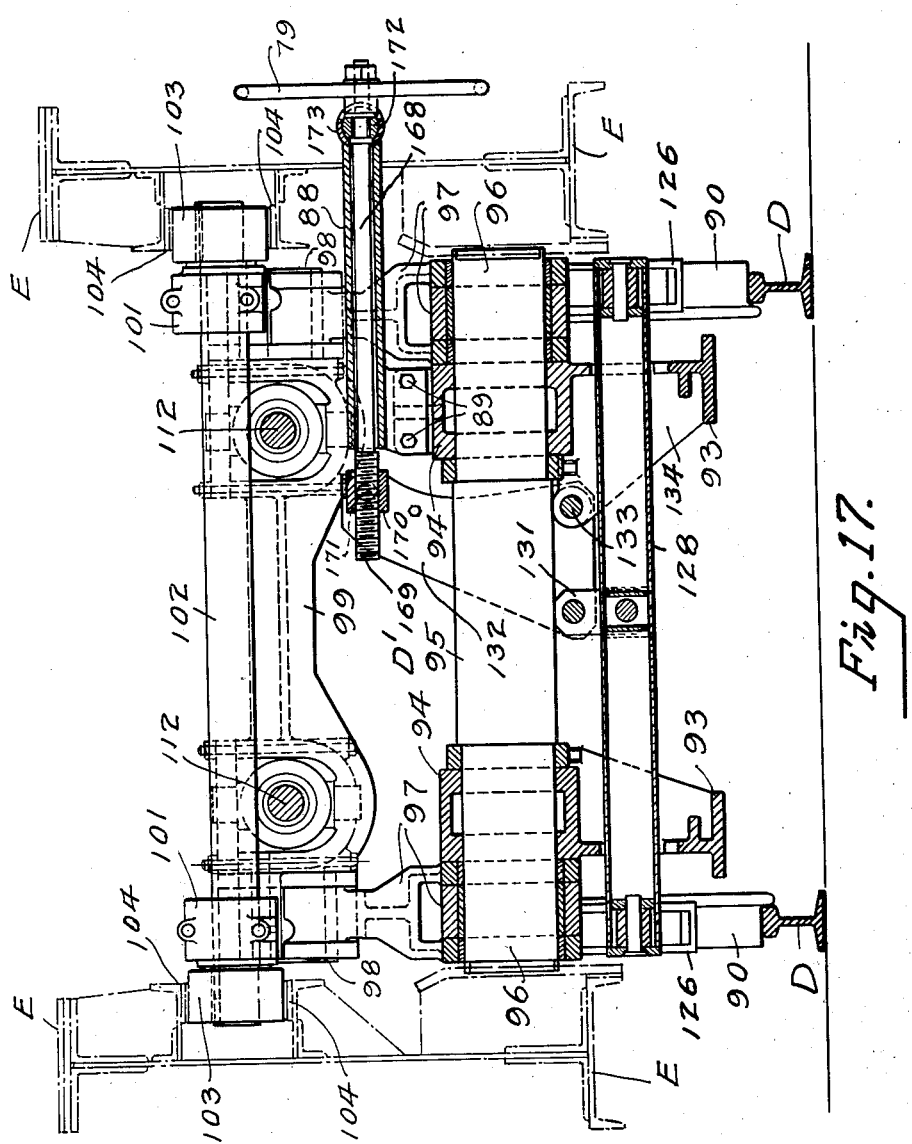

Sept. 11, 1934.  C. M. BOLSTER  1,972,863
HANDLING APPARATUS FOR AIRSHIPS
Filed Aug. 3, 1933  14 Sheets-Sheet 14
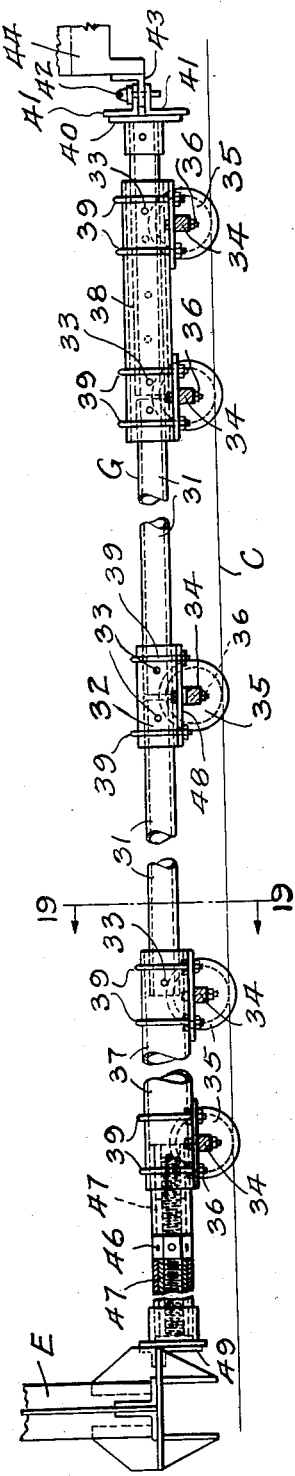
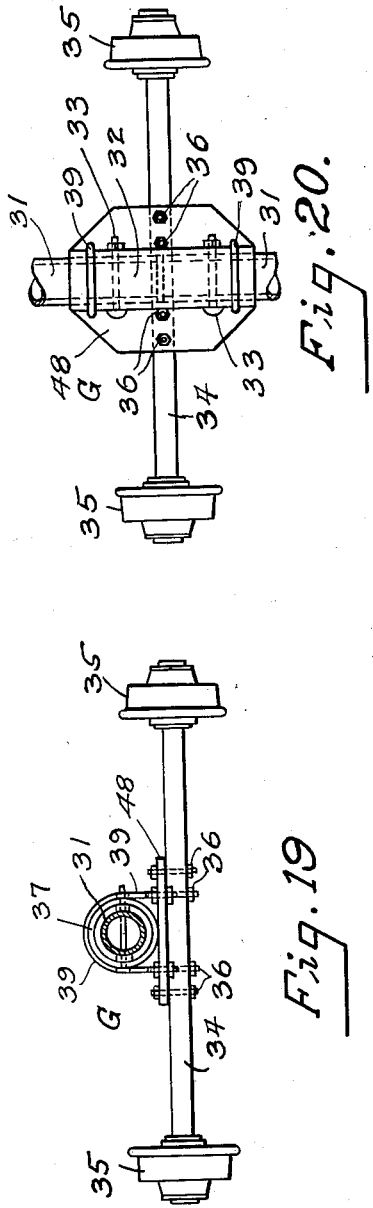
CALVIN M. BOLSTER
INVENTOR
BY
ATTORNEY Patented Sept. 11, 1934

1,972,863

UNITED STATES PATENT OFFICE 1,972,863

HANDLING APPARATUS FOR AIRSHIPS

Calvin M. Bolster, United States Navy

Application August 3, 1933, Serial No. 683,489

25 Claims. (Cl. 244—2)

(Granted under the act of March 3, 1883, as amended April 30, 1928; 370 O. G. 757)

My invention relates broadly to handling apparatus for airships and more particularly to an improved method and apparatus for undocking, mooring and berthing airships.

An object of my invention is to provide an improved means for undocking, mooring, handling, and ground maneuvering of an airship upon a landing area, and particularly for the larger types of rigid dirigibles.

A further object of my invention is to provide a mooring mechanism for securing the stern of an airship while moored by the bow to a portable mast, and particularly while the mast is located at the center of a hauling-up circle or circular track system, or during ground transportation into and out of the hangar.

A still further feature of my invention is to provide means whereby a stern handling mechanism can be transferred to or from a circular track system from or to hangar trackage as a complete unit without the releasing of securing connections, cables and bridles attached to the airship.

Another feature of my invention is to provide a stern handling mechanism for airships which may be propelled around, or allowed to swing with the airship into the prevailing wind direction, and one which may be readily transported into the hangar without detaching the same from the airship.

Another accomplishment of my invention is to incorporate in my improved stern handling mechanism means for allowing a restricted amount of flexibility in the bridle connections between the stern handling beam and the airship by providing a floating coupling having universal joint connections with the airship structure, so that the stern may be raised or lowered to cause the jury wheel attached to airship to clear the ground and/or to permit the removal of the jury wheel if desired.

With the above and other objects in view, my invention consists in the construction, combination and arrangement of parts as will be more fully hereinafter set forth as shown by the accompanying drawings and finally pointed out in the appended claims.

Reference is to be had to the accompanying drawings forming a part of this specification, in which like reference characters indicate corresponding parts throughout the several views, and in which:

Fig. 1 is a diagrammatic plan view of a conventional type of airship moored by the bow to a portable mast, and by the stern to my improved stern handling mechanism including my spacer couplings between the mast and beam.

Fig. 2 is a diagrammatic side elevation of the parts shown in Fig. 1.

Fig. 3 is an enlarged fragmentary side elevation of the stern portion of an airship, showing the detail arrangement of the handling beam and bridle connection attached to the airship.

Fig. 4 is a detail transverse vertical section looking aft and taken on the line 4—4 of Fig. 3, to more clearly show the location of the bridle connections.

Fig. 5 is a fragmentary plan view of the parts shown in Fig. 4, and showing diagrammatically the arrangement of the various details of the handling beam.

Fig. 6 is an enlarged fragmentary plan view of a portion of the stern handling beam showing one of the hauling down winches, a circular track truck and a hangar track truck.

Fig. 7 is an enlarged detail horizontal section of one of the hauling down winches and its associated operating mechanism.

Fig 8 is an enlarged fragmentary plan view of a central portion of the stern handling beam showing the general arrangement of the floating jack trolley to which the structure of the lower vertical fin of the airship is attached.

Fig. 9 is a detail side view of a portion of the handling beam and associated operating mechanism as shown in Fig. 6.

Fig. 10 is a detail side view of parts shown in Fig. 8.

Fig. 11 is a detail end view of the beam showing the relative location of the floating jack support and jury wheel.

Fig. 12 is an enlarged detail plan view of the floating jack support mechanism to which is universally attached the connection to the vertical fin of the airship.

Fig. 13 is an enlarged detail vertical section of the jacking mechanism taken on the line 13—13 of Fig. 12 and showing the support attached to the airship fin.

Fig. 14 is a vertical transverse section taken on the line 14—14 of Fig. 13, showing the detail arrangement of the centering lock of the floating support of the airship fin.

Fig. 15 is a vertical transverse section taken on line 15—15 of Fig. 13 showing the bearing rollers and shaft details.

Fig. 16 is an enlarged side elevation with parts broken away and parts shown in vertical section, showing the detail construction of one of the circular track trucks, and its associated lifting jack mechanism.

Fig. 17 is a vertical transverse section taken on the line 17—17 of Fig. 16, showing the brake operating details.

Fig. 18 is an enlarged fragmentary side view of portions of my equipment for spacing the stern handling beam and the portable mooring mast for transportation of the airship in and out of the hangar along the hangar trackage.

Fig. 19 is a detail transverse section taken on the line 19—19 of Fig. 18.

Fig. 20 is a plan view of one of the wheel mountings for supporting the intermediate portions of the spacer mechanisms.

Referring more particularly to the drawings, A designates a conventional type of rigid airship which is moored at the bow to a portable mooring mast B riding on the hangar trackage C that crosses the hauling up circle or circular track system D. A stern handling mechanism E is provided for securing the stern of the airship by a series of bridle cables F. A plurality of coupling members G placed between the mast B and the main beams of the handling mechanism E, form a rigid connection during transportation of the airship between the circular track system D and into the hangar.

The portable mooring mast B which may be one of the conventional types is provided with wheel equipped carriage trucks 30 and is transported along the hangar track system C either under its own power or by means of locomotives, as desired.

The spacer mechanism G, shown more in detail in Fig. 18, is composed of a series of rigid tubular members 31, placed end to end and jointed together by sleeve fittings 32 and bolts 33. Axles 34 are attached to the fittings 32, 37 and 38 by bolts 36 passing through the tie plates 48. U-shaped bolts 39 span the fittings 32, 37 and 38 to secure them to the tie plates 48. The fittings 38 located at one end are provided with bumpers 40 which support the coupling members 41 and flanges 43 of a small locomotive 44. The locomotive is connected by coupling pins 42. The locomotive 44 during transportation of the airship along the hangar trackage C is coupled to the frame of the mooring mast B by couplings as at 45, (see Fig. 2), and thus the locomotive 44 is only driven under its own power while placing the spacers G into position upon the rails of the hangar trackage C. During transportation of the airship and associated handling mechanism involving my invention, the spacers G are drawn along the hangar trackage by the propelling force of the mast B. The fittings 37 are provided with turnbuckle members 46 having opposed threaded ends which engage threaded sleeves 47 secured to the fittings 37 and to an angle plate 49 supported upon the main frame of the stern handling beam E.

The jury wheel H for supporting the stern of the airship at times when it is not found necessary to attach the stern handling mechanism and its bridle connections, is attached at the base of the lower fin A', and is provided with a pneumatic tire 50 for absorbing the shock of contact with the landing field. The jury wheel is only put into service in very favorable and mild weather conditions, or when it is desired to moor the airship to the portable mast along the hangar tracks C or during the preparation for securing the stern handling beam.

The wheel H is secured to the frame structure 51, connected to the fin A', is provided with a race way 52 so that the wheel may swing 360 degrees in a horizontal plane.

The jury wheel H and frame structure 51 are detached before taking off, and provisions are made for jacking up the stern handling mechanism which will be described later.

The stern handling mechanism designated in general by the character E consists of the main beam structure upon which are mounted the various mechanisms such as the hangar trackage trucks C', the circular track trucks D', the hauling down winches F', the bridle cables F, and the floating jack support I upon which the lower fin A' of the airship is attached. The airship while attached to the portable mast and the stern handling beam may swing freely back and forth at the stern around the circular tracks into prevailing wind directions or may be hauled around the tracks and brought into position to register with the hangar trackage when the circular track truck D' are raised to cause the hangar track trucks C' to contact with the hangar trackage C for transportation into and out of the hangar against cross hangar wind loads.

The airship when entering or leaving the hangar is moored by the bow to the portable mooring mast B and at the stern by the stern handling beam E and bridles F, and, thus, is relieved of the strain caused by ground transportation through the elongated coupling connections G provided between the mast B and the handling beam E.

A fitting 55 secured at the lower end of the fin is provided with a universal connection so as to permit limited rocking movement to the airship and includes the upper members 55a and 55b pivotally connected by a pin 55c. Member 55b terminates in downwardly extending flanges 56 having apertures for receiving a pin 58 which registers with an aperture located at the upper end of spindle 57 of the floating jack mechanism I. The spindle 57 is mounted in a casting 59 which is provided with flanged wheels 60 mounted to travel in a transverse direction to the axis of the airship along tracks 61 secured to floating frame members 62.

Upon rotation of the crank 63 located upon a shaft 63' mounted in bearings in the casting 59, the stern of the airship may be raised sufficiently to cause the jury wheel H to clear the ground and tracks. The shaft 63' is connected by gears 64, 64', 65' and 65" and shaft 65 to rotate a threaded screw shaft 66 projected through a threaded nut 67 secured into the lower end of the spindle 57.

The locking of the floating jack I when centering the airship upon the beam E is accomplished by means of the locking pins 68 (see Fig. 14), connected by toggle links 69 and a cross head 70. The pins 68 are adapted to protrude through registering apertures 71 located in the sides of the floating frame 62. The cross head 70 is secured to the shaft 72 provided with a lever 73 located on top of the casting 59. An arm 74 secured to the shaft 72 (see Fig. 12) is provided with a rod 75 which exerts a constant pull against a stop 76 by means of a tension spring 77 located around the rod 75. The casting 59 may be moved along the tracks 61 as the airship is being hauled down by the bridle connections and winches and the support 57 may be manually moved along until it is lined up under the fin.

The frame 62 upon which the casting 59 is permitted limited travel in a transverse direction to the airship axis is provided with beams 80 which are movably mounted upon guide rollers 81 bracketed upon the main handling beam E and is made adjustable in a fore and aft direction parallel to the airship axis by racks 82 located upon the beams 80. The racks 82 are engaged by pinions 83 secured to the shaft 84. The shaft 84 also acts as a bearing for certain of the rollers 81 which are loosely mounted thereon. Movement of the frame 62 is transmitted through the racks 82, pinions 83 and shaft 84 by a manually rotated hand wheel 85 and gears 86 which are mounted in bearings upon the main beam E.

By rotating the crank 63 the stern of the airship may be moved vertically, while transverse movement is accomplished by travel of the casting 59 along the frame 62, and movement parallel to the axis of the airship is accomplished by rotation of the hand wheel 85.

The circular track trucks D' are preferably located along the main beam E outwardly of the trucks C' for engagement with the rails of the hangar trackage C, thus, more uniformly distributing the weight of the beam and providing as wide a footing as possible transversely of the airship so as to reduce the amount of rocking or side rolling of the airship when being transmitted to the circular tracks.

The circular track trucks D' are each provided with wheels 90 which travel along the rails of the circular track system D. These wheels 90 are secured to axles 91 having journal boxes 92 in the side frames 93 which extend between each pair of wheels 90. Bearings 94 are also provided in the side frames 93 which are centrally located between each pair of wheels 90 (see Fig. 17) to receive a cross shaft 95 extending beyond the lines of the frames 93 to provide trunnions 96 for a series of diverging wheel actuating links 97. Each of the links 97 are mounted at their upper ends to trunnions 98 extending outwardly from a plurality of cross frames 99. The trunnions 98 are of sufficient length to support a series of bearing brackets 100 designed to straddle each of the upper ends of the links 97 and are provided with bearing surfaces covered by caps 101. The brackets 100 are designed to receive a plurality of cross shafts 102 extending beyond the sides of the trucks D' and are equipped at their extreme ends with rollers 103 which are located between bearing rails 104 carried by the main beam E.

The rollers 103 by contact with the bearing rails 104 provide supports upon which the wheels 90 are raised clear of the rails of the circular track system D when the links 97 are spread apart. When the links 97 are contracted the wheels 90 will engage the rails of the circular track system D and jack up the main handling beam E sufficiently to cause the wheels 87 of the hangar trackage trucks C' connected to the main beam E to be lifted clear of the hangar trackage C and thus the beam E will be free to travel upon the circular track system rails D.

Power for actuating the trucks D' is preferably transmitted from a source of motive power housed under the hood 105 conveniently located for access thereto upon frame members 106 extending from the main beam E through the drive shaft 107, bevel gears 108, speed reduction or power increasing gears 109 and shaft 110 (see Fig. 8). The power is then transmitted through additional speed reduction gearing 111 (see Fig 6), to rotate the opposed threaded shafts 112, which are connected to the source of power from the shaft 110 through universal joints 113. The shafts 112 are provided with trunnioned and threaded traveler sleeves 114 mounted in bearings provided in the cross frames 99. By reference to Figs. 6 and 8, it will be seen that motive power thus transmitted from the source 105 is very greatly increased through the ratio of gearing when delivered to the truck D' and that a very powerful lifting force is produced for raising the main beam E and thereby the stern end of the airship when attached to the same.

The braking mechanism for the circular track trucks D' consists of brake shoes 126 which contact with the wheels 90 mounted on trunnions 127 extending outwardly from the sides of the frames 93. Brake beams 128 extend through openings 129 in the side frames 93 and are connected by adjustable turn buckle members 130 between the brake shoes 126 and the beams 128. Links 131 (see Fig. 17) are pivotally connected to the beams 128 in the center of the truck D' to operate members 132 which are provided with fulcrum bearing pins 133 mounted to one of the side frames 93 of each truck upon frame brackets 134. Hand wheels 79 are secured to shafts 168 mounted in bearing sleeves 88 attached to the side frames 93 as at 89. The shafts 168 have limited side play and are provided with threaded ends 169. Threaded follower blocks 170 on the threaded ends 169 are provided with trunnions 171 which extend through apertures in the members 132. Forked bearings 173 are located at the outer ends of the bearing sleeves 88 to receive the trunnions of the bearing collars 172. Thus, rotation of the hand wheels 79 will create a very powerful braking force upon the wheels 90.

When it is desired to manually jack the trucks D' a cranking mechanism 115 may be put into action for each truck independently by throwing in mesh the loosely splined or keyed gears 118 on the power shaft 107 with the gears 119 secured to the shafts 117 and operating the shaft 117 by cranks 116.

The platform 120 (see Fig. 8) is of sufficient size to provide space for ballasting of the main beam E when necessary to weight the mechanism down in very stormy weather conditions or the platform may be conveniently utilized for members of the handling crew on look-out duty.

The hangar track trucks C' are mounted upon the structure of the main handling beam E by a centering fitting 121 (see Fig. 9), having a bearing pin 122 for attaching the truck bolsters 123 to which the wheel carriages 124 for supporting the journal boxes 125 of the track wheels 87 (see Figs. 6 and 9) are attached.

Hauling down winches F'' are located along the beam E for bringing down the stern of the airship A so that the same may be attached to the spindle 57 of the floating jack mechanism I and thus, anchor the stern of the airship to the beam E. This is accomplished through a series of block and tackle mechanisms, sheaves, cables and bridle cables, secured at selected positions along the airship frames such as noted for example as stations No. 0, station No. 17.5 and station No. 35. The bridles secured to the above noted stations are designated as 135, 136 and 137 respectively, and are looped through sheave blocks 138, 139 and 140 to equalize the tension exerted on the fairlead cables 141, 142 and 143, which are secured to the sheave blocks 138, 139 and 140 and are attached at their lower ends to similar sheave blocks 174, 175 and 176, through which the main hauling in winch cables 144 are passed in zig-zag arrangement through the sheaves of the anchor

6. In a stern handling mechanism for airships, in combination, a main beam located transversely of the airship, a plurality of track trucks mounted upon said beam parallel to the axis of the airship for travel along a hangar trackage, a plurality of jacking up trucks adjustably mounted on said beam for travel along a circular track system, means for mechanically adjusting said jacking up trucks for causing the said beam to lift said track trucks, a centering mechanism located upon said beam, means for transmitting restricted transverse and lateral movement to said centering mechanism, universal connections between said centering mechanism and the frame structure of the airship, jacking means within said centering mechanism for restricted vertical adjustment of said universal connections, hauling down winches located toward the ends of the beam, mooring cables for said winches, sheave blocks located at the extreme ends of said beam for guiding said mooring cables, bridles for engagement of said sheave blocks secured to the frame structure of the aircraft.

7. In a handling, mooring and berthing mechanism for airships, in combination, a circular track system, a field trackage intersecting the center of said circular track system and extending to within the airship hangar, a mooring mast adapted for movement to a position centrally of said circular track system and upon said field trackage for mooring the airship by the bow, a handling beam secured by universal connections centrally of the beam and by the airship bridle connections outboard of the beam, a means comprising a coupling for rigidly spacing the mooring mast from the beam for transportation along said field trackage into and out of the airship hangar, and means for accomplishing the transfer of the handling beam from the circular track system to the field trackage.

8. In a handling and mooring mechanism for airships, in combination, a circular track system, a hangar trackage intersecting the center of said circular track system, a mooring mast adapted to be positioned at the center of said circular tracks and upon said hangar tracks for mooring the airship by the bow, a handling beam, winches supported by said beam, mooring cables adapted to be wound upon said winches for hauling down purposes, bridle cables secured to the airship frame structure, block and tackle connections between said bridle cables and said mooring cables, universal connections located centrally of said beam for assuring the airship restricted pivotal movement, means for transfer of said beam for movement along the circular track system to movement along the hangar trackage, and means for coupling the handling beam to the mooring mast for transportation of the beam along the hangar trackage.

9. In a handling and mooring mechanism for berthing airships, in combination, a circular track system, a hangar trackage extending through the central portion of the said circular track system, a mooring mast adapted to be located in juxtaposition to the center of said circular track system for mooring an airship by the bow, a handling beam, a plurality of circular track engaging trucks secured to said handling beam, a plurality of hangar trackage engaging trucks secured to said handling beam, means for raising and lowering one set of trucks to cause the other set of trucks to become actively engaged, cable winches supported by said beam, mooring cables adapted to be wound upon said winch for hauling down purposes, bridle cables secured to the airship frame structure, block and tackle connections between said bridle cables and said mooring cables, and universal connections located centrally of said beam for assuring the airship of restricted play.

10. In a stern handling beam for airships, in combination, a main beam, a series of circular track engaging truck units secured thereto, a second series of track engaging truck units secured to said beam at right angles to said circular track engaging truck units, means for raising and lowering one series of truck units for causing the other truck units to become actively engaged, cable winches supported by said beam, mooring cables adapted to be wound upon said winches for hauling down purposes, bridle cables secured to the frame structure of the airship, block and tackle connections between said bridle cables and said mooring cables, and a floating universal connection located centrally of said beam for providing restricted adjustment for the airship connections.

11. In a handling, mooring and berthing mechanism for airships, in combination, a circular track system, a hangar, a hangar trackage intersecting the center of said circular track system and extending into said hangar, a portable mooring mast adapted to travel on said hangar trackage in juxtaposition to the center of said circular track system for mooring the airship by the bow, a handling beam, means for securing the said handling beam to the stern of the airship, means for transfer of said handling beam from movement around said circular track system to said hangar trackage, and means for coupling said handling beam and said mooring mast for transportation along said hangar trackage to within said hangar.

12. In a handling, mooring and berthing mechanism for airships, in combination, a circular track system, a hangar, a hangar trackage bisecting said circular track system and extending within said hangar, a portable mooring mast adapted to travel on said hangar trackage to the center of said circular track system for mooring the airship by the bow, a handling beam, means for pivotally attaching the stern of the airship to said handling beam for permitting limited side rolling motion and adjustably restricted vertical movement, means for transfer of said handling beam from movement around said circular track system to said hangar trackage, a coupling between said handling beam and said mooring mast for rigidly joining the same for transportation along said hangar trackage to within said hangar.

13. In a handling mechanism for relieving an airship from abnormal stresses during ground transportation to and from a hangar, in combination, a portable mooring mast for attachment of an airship at the bow, a stern handling beam, means for attaching the stern of the airship to said beam, spacing coupling members attached between said beam and said mast comprising a series of struts supported at intervals by cross axles having wheels.

14. In a handling mechanism for ground transportation of airships, in combination, a portable mooring mast for receiving a bow mooring attachment, a stern handling beam for receiving stern attachments, spacing members attached between said beam and said mast comprising a series of struts placed end to end and joined at intervals by wheel equipped fittings.

15. In a handling mechanism for ground transportation of airships, in combination, a portable mast for mooring an airship by the bow, a stern handling beam for receiving stern attachments, detachably mounted spacing members attached between said mast and said beam comprising a series of rigid units placed end to end and joined at intervals by sleeve fittings and being supported by wheels attached to axles secured to the sleeve fittings.

16. In a handling mechanism for ground transportation of airships, in combination, a portable bow mooring, a stern support, a coupling member detachably secured between said bow mooring and stern support, said coupling member comprising a series of rigid units placed end to end and joined at intervals throughout their length by sleeve fittings provided with surface engaging support.

17. In a handling mechanism for ground transportation of airships, in combination, a portable bow mooring, a stern support, a series of rigid units placed end to end, fittings connecting said units, axles secured to said fittings, wheels mounted on said axles, threaded sleeve connections at one end of said units and to said stern support, turnbuckle barrels having opposedly threaded ends for engagement with said threaded sleeves, coupling pin connections at the bow end of said units, a self propelled unit between said coupling pin connections and said portable mooring for transporting said units into position.

18. In a stern handling mechanism for ground transportation of airships, in combination, a main beam, wheeled trucks attached at right angles to said beam for movement parallel to the axis of the airship, wheeled trucks attached to said beam at right angles to said first wheeled trucks for movement transversely to the axis of the airship, means for jacking up and lowering said beam for effecting movements at approximately right angles.

19. In a stern handling mechanism for ground transportation of airships, in combination, a main beam, a floating support adjustably attached to said beam for universally connecting the stern of the airship, means for locking said floating support centrally on said beams, and means for adjusting said support in a horizontal plane and transversely of the beam.

20. In a stern handling mechanism for ground maneuvers of airships having a jury wheel attached to the stern thereof for taxiing into berthing position while moored to a portable mooring mast, in combination, a main beam, a floating support attached to said beam for universally connecting the stern of the airship, means for locking said floating support centrally on said beam, means for adjusting said support in a horizontal plane and transversely of the beam, and means for jacking said floating support and thereby lifting load carried by the jury wheel attached to the airship.

21. In a stern handling mechanism for airships having a jury wheel attached to the stern for taxiing into berthing position while moored to a portable mast, in combination, a main beam adapted to travel along a circular trackage of a hauling up circle, a pedestal located centrally of said beam, a frame on said beam slidably mounted for fore and aft movement parallel to the airship axis, means for manually moving said frame, a wheel supported carriage adapted to limited travel along said frame, a universal connection between said pedestal and the airship, a stanchion for said pedestal having guide ways therein and supported by said carriage, a threaded standard engaging a threaded block secured within said pedestal, a series of gears, a shaft and a crank for raising said pedestal and thereby raising the stern of the airship attached thereto for relieving the load from the jury wheel, and a lock for securing the said carriage in centered position on said frame.

22. In a floating connection between the stern of an airship and a stern carriage for permitting limited vertical and horizontal movement therebetween, in combination, a frame on the carriage, means for moving said frame transversely of the beam, guide rails secured to said frame, a wheel supported carriage adapted to travel on said guide rails, a pedestal supported by said carriage, a universal connection between said pedestal and the airship, a stanchion for said pedestal, guide ways in said stanchion, a threaded standard engaging a threaded block secured within the said pedestal, a series of meshed gears and a shaft actuated by a crank for raising and lowering said pedestal, a locking mechanism connected between said carriage and said frame for centering said pedestal.

23. In a floating connection between the stern of an airship and a stern handling carriage for permitting limited play therebetween, in combination, a frame slidably connected to the handling carriage, means for moving the frame transversely of the carriage, guide rails secured to said frame, a wheel supported car adapted to travel on said guide rails, a pedestal supported by said car, a universal connection between said pedestal and the airship, means for vertically moving said pedestal, and means for locking said car in position upon said frame.

24. In a stern handling mechanism for airships, in combination, trackage having right-angle intersections, a main beam, track engaging units secured to said beam, means for jacking up certain of said track engaging units for allowing said beam to travel at right angles upon said trackage, a carriage adapted to travel along said beam, universal connections on said carriage for attachment to the airship, winches supported by said beam, cables for said winches, sheaves for guiding said cables, bridle connections for attaching said cables to the airship, and means for attaching said bridle connections to said cables.

25. In a stern handling mechanism for airships, in combination, circular trackage, cross trackage intersecting said circular trackage parallel to a radius through a mean position thereof, a main beam adapted to travel upon either of said trackages, a plurality of wheeled trucks secured to said main beam adapted to travel along said cross trackage, a plurality of jacking up trucks adjustably mounted to said beam and adapted to travel along said circular trackage, means for operating said jacking up trucks, a carriage adapted to travel along said beam, a floating pivot connection supported by said carriage for attaching the airship, hauling-in winches supported by said beam, cables connecting said winches to the airship structure, and block and sheave connections between said winches and the airship for said cables.

CALVIN M. BOLSTER.